3,495,743
**AUTOMATIC ADDITION OF LIQUID
CHEMICALS IN LAUNDRIES**
Robert A. Mohr and Walter S. Medley, Sacramento,
Calif., assignors to Community Linen Rental Service,
Los Angeles, Calif., a corporation of California
Filed Apr. 22, 1968, Ser. No. 722,846
Int. Cl. B67d 5/40
U.S. Cl. 222—318                                          8 Claims

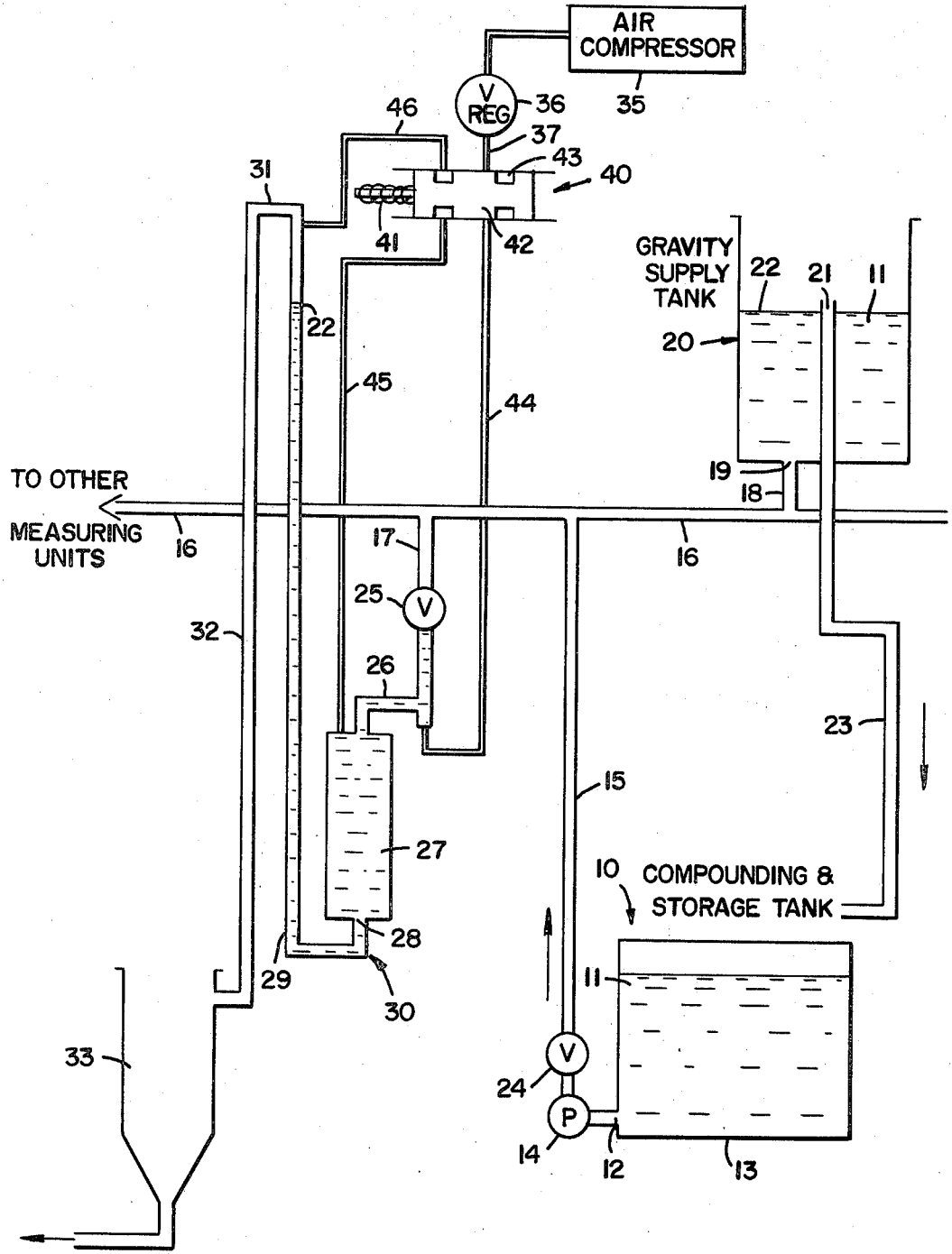
FIG_1

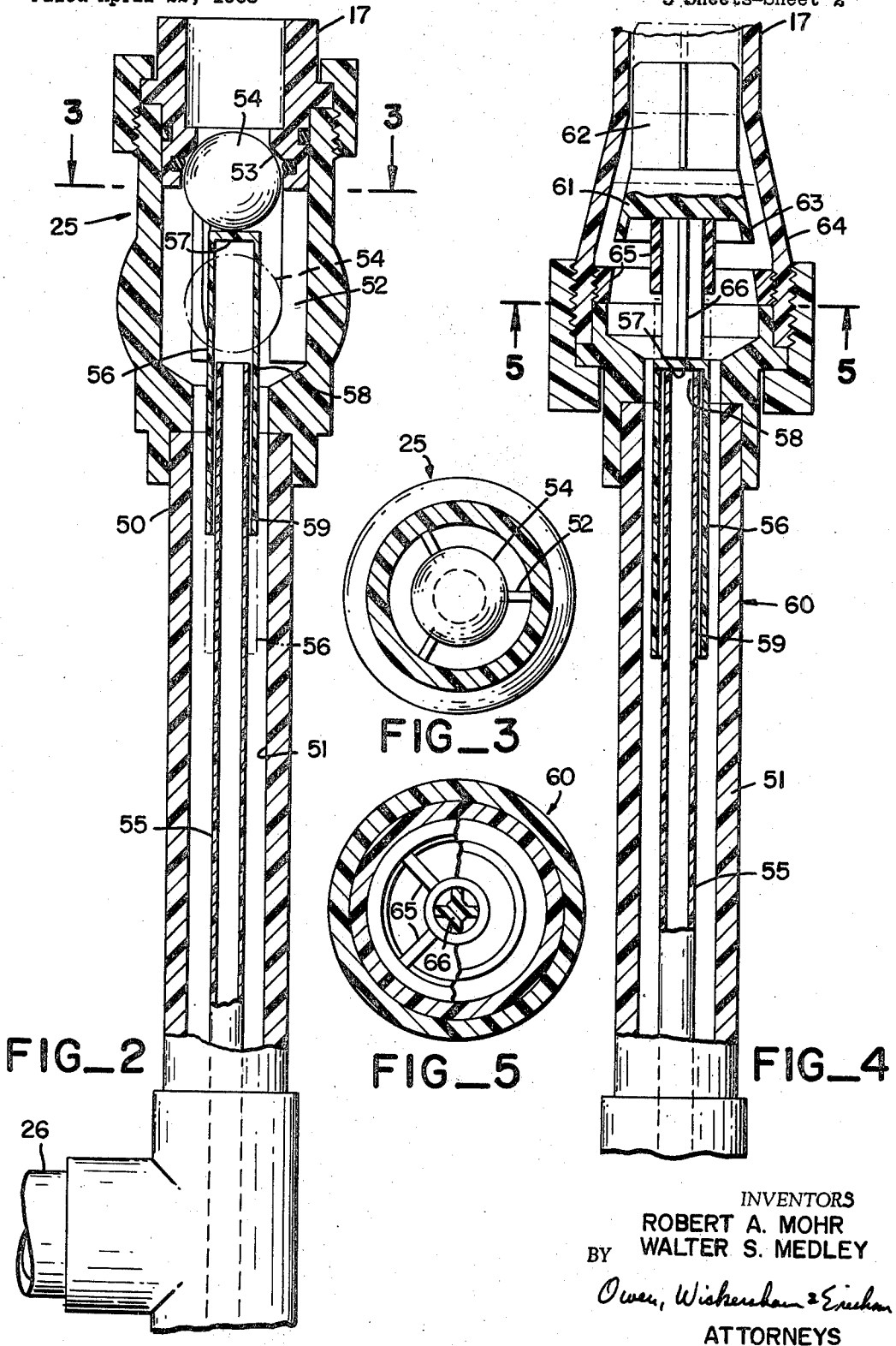

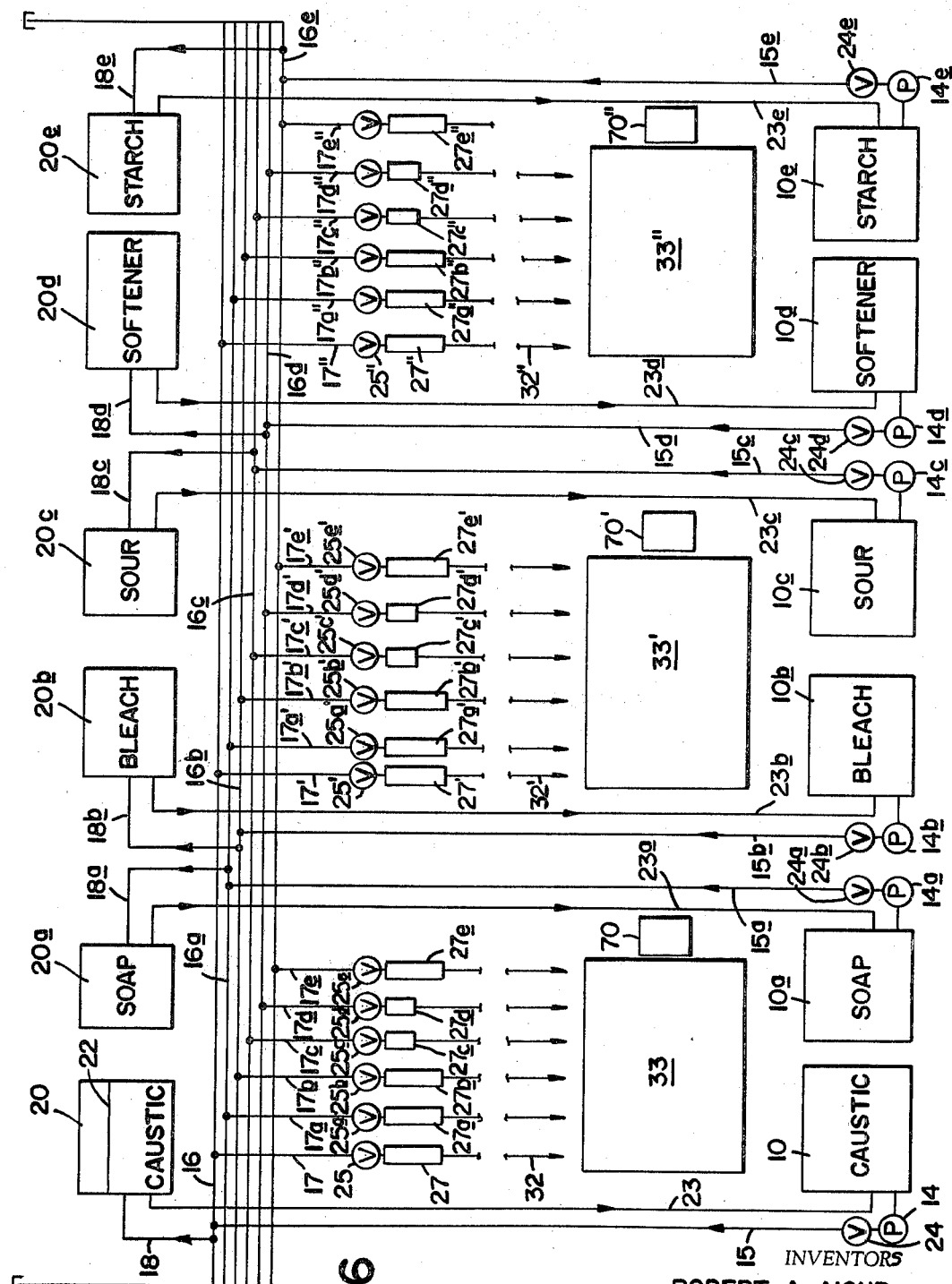

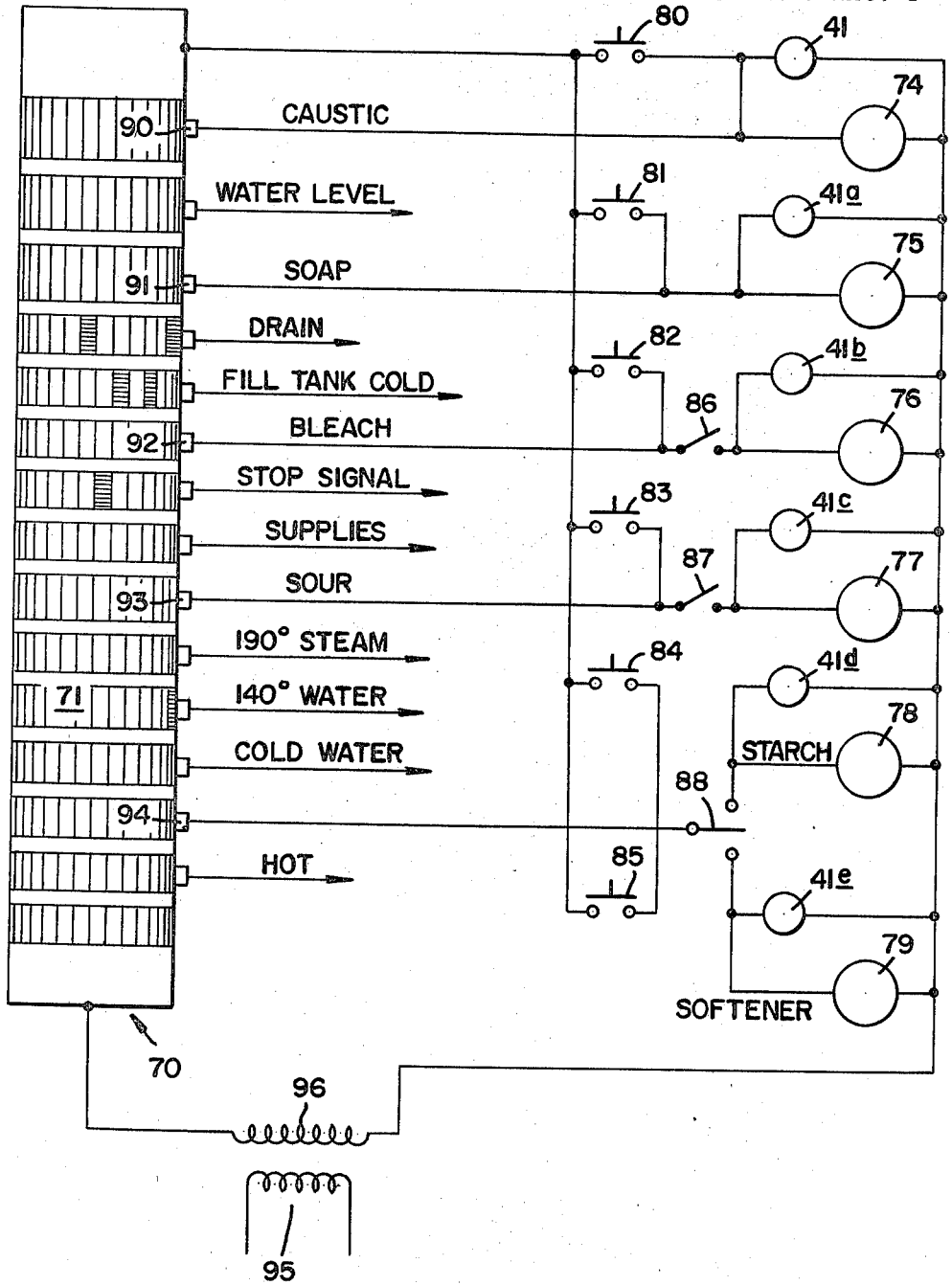
FIG_7

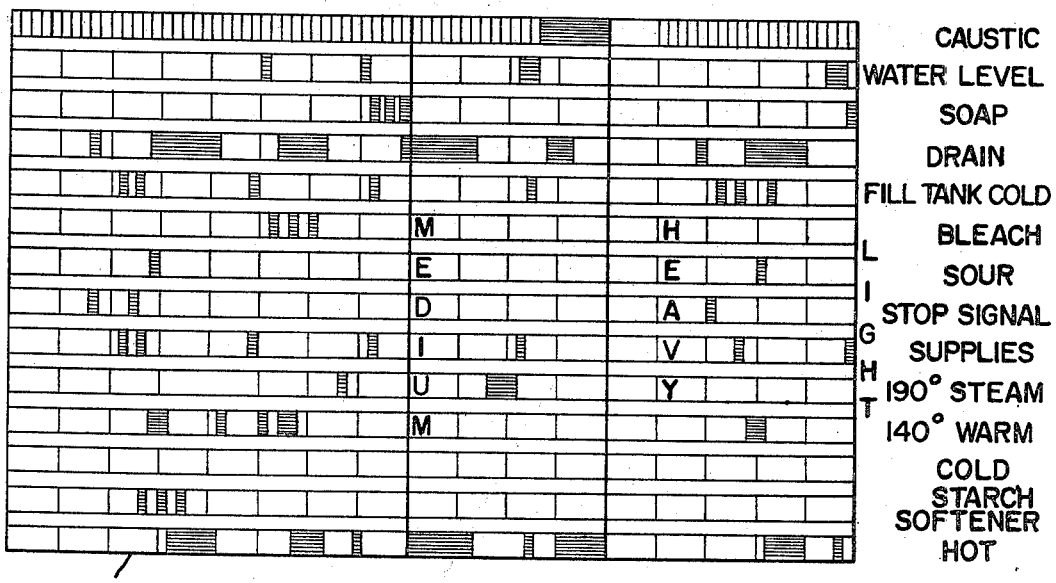
FIG_8
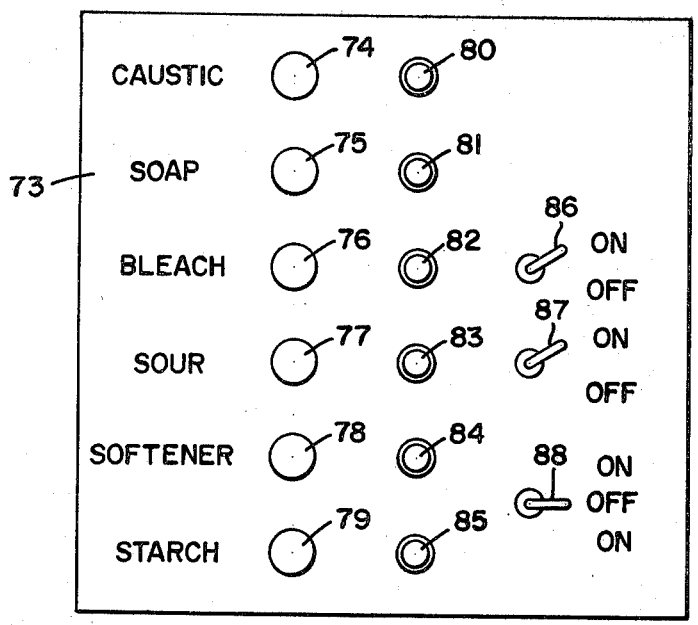
FIG_9
INVENTORS
ROBERT A. MOHR
BY WALTER S. MEDLEY
ATTORNEYS United States Patent Office 3,495,743
Patented Feb. 17, 1970

ABSTRACT OF THE DISCLOSURE

Liquid chemicals are automatically added in a laundry process. A circulating pump continuously moving each liquid chemical from a compounding and storage tank to a gravity flow supply tank but is ineffective for heights above a head level in the latter tank. A main conduit is at all times connected to the bottom of the gravity tank and to the pump. Branch conduits each have a normally open air-actuated closure valve below the gravity tank and connect that tank to or separate it from a measuring system extending up to said head level, the capacity of the measuring system being a volume that measures a charge of its liquid chemical. A discharge conduit connected to the measuring system extends a substantial distance thereabove and thence down to a discharge outlet. Compressed air is controlled by air valve means for supplying the air to the closure valve and measuring system to close the valve and then to eject the measured charge from the measuring system, where the air valve disconnects the closure valve for air, the valve is opened by the liquid chemical and the measuring system is filled by gravity. All the conduits, the measuring system, and the closure valve are made of corrosion-resistant plastic.

The closure valve itself comprises a valve seat, a movable valve member normally urged by gravity down away from the seat, and sleeve with a closed end inverted on a vertical conduit for air with lateral clearance and with its closed end resting on the upper end of the vertical conduit. Kinetic energy forces said sleeve up to move the valve member up, the length of said sleeve being greater than its movement up.

A plurality of systems are used with a plurality of washing machines with automatic program devices.

---

This invention relates to a system for automatically adding liquid chemicals to an automatic washing cycle or the like, especially for commercial laundries.

While so-called automatic laundries of the individual home type or of the type used in self-service laundries for individuals are well known, it is also well known that they do not add the chemicals automatically for cycle after cycle; instead, these washing machines have had to be hand-filled with soaps, bleaches, and so on. This is also true generally of large commercial laundries; very few have any provision for adding any chemicals automatically. The commercially used laundry chemicals are generally added as liquids, but, even so, in almost all commercial laundries chemicals are still added by hand.

An important factor in preventing the use of automatic devices for adding liquid laundry chemicals is the extremely corrosive nature of many of the chemicals used in commercial laundering: Instead of gentle soaps and mild bleaches, commercial laundries have relied on such metal-corroding materials as lye and other caustics, strong acids and chemicals which would not be considered safe around the home and which, correspondingly, have to be handled with care. These corrosive chemicals have hitherto made it uneconomical to attempt to provide automatic addition systems, for metering valves of the ordinary type are simply out of the questions; these corrosive materials damage such metering valves so fast that they rapidly become inaccurate and unreliable and are destroyed within a short period of time.

Recently, some attempts at automatic liquid-addition systems have been made in cooperation with modern programmed control of commercial-laundry washing machines. While these systems have been able to eliminate the physical handling of chemicals, they have been very costly, very complicated, and have been subject to a great deal of trouble. A great deal of maintenance and much replacement of parts have been required by the very corrosive materials being handled, which have damaged the meters, orifices, valve seats, and other parts of such systems. As a result, these automatic systems for adding liquid chemicals have made little headway against the less convenient but more reliable hand addition.

Thus, an important object of htis invention is to provide an automatic dispensing system for competent and substantially foolproof handling of corrosive chemicals in an automatic laundry cycle or in any programmed laundry system.

Another important object of the invention is to provide an inexpensive and practical automatic chemical dispensing system, one without meters, without timers, without large electric valves, and without measuring orifices that can wear or become clogged by corrosive liquids.

Achievement of these objects is attained by employing a novel gravity operated measuring system in which the only valve that comes into contact with the liquid is an all-plastic closure valve assembly, which is not damaged by quite corrosive chemicals. The only other valve used in each measuring system is in the pneumatic control which supplies compressed air to operate the closure valve.

To explain the invention in a little more detail, a liquid-chemical reservoir fills by gravity a measuring pot and associated conduit with the desired corrosive chemical, the volume of the conduit system being taken into account as part of the total volume measured. Then compressed air is used to close a valve that cuts off further supply of the liquid chemical and to discharge the measured quantity, i.e., the liquid in the measuring pot and the conduits beyond the valve. As stated, a gravity system is employed for measuring, and a constant liquid level or head governs the quantity measured. The closure valve is held closed as long as the compressed air continues to flow to it, and when the compressed air is cut off, the valve is opened to receive by gravity fill a new measured charge into the measuring system. During filling, any air trapped in the top of the metering pot is bled off above head level.

In a complete system employing this invention, there are sets of measuring units, each with its one closure valve, one measuring unit for each chemical for each washing machine. Since these commercial washing machines are large, washing several hundred pounds of laundry each cycle, there are usually only a few in any plant, and all the measuring units for each chemical may have a common gravity supply. For example, there may be six such chemicals to be added; if so, they can be added from a total of six supply tanks for the whole laundry, no matter how many washing machines are there. Moreover, the chemical addition is easily set up for incorporation into automatic programs for the washing machines. The possible chance that all of the washing machines in the laundry may demand the same liquid simultaneously does not affect either the measuring or the discharge of that liquid.

Other objects and advantages of the invention will appear from the following description of a preferred embodiment.

In the drawings:

FIG. 1 is a somewhat diagrammatic view in elevation of a system embodying the principles of the invention for automatically adding one liquid chemical to one automatic laundry machine.

FIG. 2 is a view in elevation and partly in section of a closure valve of a type suitable for use in the system of FIG. 1.

FIG. 3 is a view in section taken along the line 3—3 in FIG. 2.

FIG. 4 is a view in elevation and in section of a modified form of closure valve also usable in the system of FIG. 1.

FIG. 5 is a view in section taken along the line 5—5 in FIG. 4.

FIG. 6 is a simplified diagram of a system according to the invention for six chemicals and three large automatic washing machines.

FIG. 7 is an electrical wiring diagram of the control system for one washing machine of FIG. 6.

FIG. 8 is a plan view of a typical program sheet for use in the circuit of FIG. 7.

FIG. 9 is a view in front elevation of a control unit of the circuit of FIG. 7.

Each chemical is handled in liquid form and is measured by a system generally like that shown in FIG. 1. A compounding and storage tank 10 for a chemical 11 has an outlet 12 near its lower end 13. The outlet 12 leads to a circulating pump 14 that sends the liquid chemical 11 through a pipe 15 to a common conduit 16 which may go to several measuring units, one for each of several machines, by one or more branch conduits 17. Also, a branch conduit 18 leads up into a bottom inlet 19 of a gravity flow supply tank 20. The tank 20 has an overflow outlet 21 defining a head at a precisely determined lever 22, and overflow liquid 11 from the outlet 21 returns by a conduit 23 to the tank 10. The pump 14 runs continuously, a throttling valve 24 being used to prevent the pump 14 from filling any measuring system any substantial amount above the head level 22.

For each washing machine in the overall system, there is a branch conduit 17 leading to a pneumatically operated closure valve 25 and from there by a conduit 26 into the upper end of a measuring pot 27. The measuring pot 27 has a lower outlet 28, preferably at its lowest end, into a conduit 29 which rises upwardly to a height well above the level 22. The valve 25, conduit 26, pot 27, and conduit 29 thus constitute a measuring unit or measuring system 30. Above the level 22 is a bend 31 from which a downwardly extending conduit 32 leads to a discharge hopper 33 which puts the chemical into a washing machine. The liquid 11 that flows by gravity into the unit 30 when the valve 25 is open, is automatically leveled at substantially the same level 22 as the outlet 21, with the aid of the throttle valve 24. All the conduits 15, 16, 17, 23, 26, 28, 29 and 31 are preferably corrosive-resistant plastic pipe, such as polyvinyl chloride, and so are the valves 24 and 25, and the pot 27.

Compressed air for pneumatic control of each valve 25 is provided from an air compressor 35 through a regulating valve 36 and conduit 37 to a valve 40. The valve 40 may be of any of several different types; for example, a solenoid-operated valve having a solenoid 41 and a valve spool 42 in a passage 43, with gravity or spring return. In its discharge position (i.e., for discharging the measured charge from the system 30 into the discharge hopper 33), the spool 42 connects the conduit 37 to an air conduit 44 which goes into an air inlet in the bottom of the valve 25, forcing the valve 25 to its closed position. Then the flow of air forces the measured charge of liquid out of the measuring system 30 into the discharge hopper 33. Thus, this blast of air exhausts one measured charge. So long as this air flow, its kinetic energy is used to maintain the valve 25 in its closed position; so no more liquid 11 comes into the measuring unit 30 as long as the valve 40 is in its "discharge" position.

When the solenoid 41 is caused to move the valve spool 42 to its "fill" position, the valve 40 then connects a conduit 45 which leads to the upper end of the measuring pot 27 to a conduit 46 which goes into the conduit 29 at a location above the predetermined level 22 and below and before the horizontal portion 31, so that any air trapped in the measuring unit 30 as it is being refilled by the liquid 11 is bled to the atmosphere by the conduit 31, 32. Also, any foam finding its way into the conduit 46 is retained on the measuring side of the top 31 of the discharge conduit, and the liquid component of the foam rejoins the rest of the liquid at the head level 22. This prevents liquids from the foam from going into the discharge hopper 33 at times when it might react with other chemicals that also are supplied to the washing machine through the hopper 33.

The operation of this system is simple and is substantially foolproof. The measuring unit 30 always measures liquid up to the head level 22. Then, when the air is applied, it closes the valve 25 and discharges the measured amount into the hopper 33, and the unit 30 is ready for a new charge as soon as the valve 25 is again opened.

FIGS. 3 and 4 show one type of plastic valve 25 that may be used in an all-plastic system. This valve 25 has a vertical housing 50 providing a vertical conduit 51. Above the conduit 51 is a valve cage 52 having a seat 53 at its upper end and a ball 54. An inlet tube 55 for air is connected to the conduit 44 and goes up inside the conduit 51, and at the top of this inlet tube 55 is a cylindrical sleeve 56 with a closed end 57, inverted over and covering the outlet 58 from the tube 55. When the compressed air is shut off by the valve 40, the sleeve rests on the end 58 and the ball 54 rests on or near it. When air is applied, the sleeve 56 is forced up to the position shown in FIG. 3, forcing the ball 54 against the seat 53, while at the same time air flows out through a clearance space 59 provided by the loose fit between the sleeve 56 and the main air conduit 55. Since both the ball 54 and the sleeve 56 are plastic, they are light in weight, and the ball 54 is immediately forced against its seat 53 and is maintained thereby the kinetic energy of the flowing air, not by the air pressure, while the air flowing out the clearance 59 is directed down into the passage 26 to discharge the liquid from the system 30. This all-plastic system therefore demands little precision in manufacture of its parts, and they may be molded or extruded, depending on the part.

A modified form of valve 60 is shown in FIGS. 4 and 5, wherein a valve plug 61 has an upper cylindrical guide 62 member going up into the conduit 17 and a conical closure portion 63 mating with a conical seat 64. A cage 65 guides a lower stem 66. Again, all parts are plastic.

Thus, with these or other simple expedients, it is possible to obtain sufficient accuracy from a plastic valve without having any metal parts or any "metering" valves subject to corrosion. Polyvinyl chloride and other suitable plastics may be used. The real control is in the gravity system plus the pneumatically activated closure valve 25, and in this valve, the sleeve 56 is operated by kinetic energy rather than by pressure.

FIG. 6 shows diagrammatically the extension of the system of FIG. 1 to a plurality of ingredients and a plurality of washing machines. By way of example, six typical ingredients are shown. These are caustic (e.g., sodium hydroxide), soap (usually a synthetic detergent), bleach (e.g., sodium hypochlorite), a sour solution or acid (e.g., hydrofluoric acid), a fabric softener, and a starch. Whether any of these six ingredients is to be used and at what times is controlled by a programming apparatus, one for each of the automatic washing machines, of which three are assumed to be present here, though only the discharge hoppers 33, 31' and 33' for the chemicals are shown, since any type of such washing machine may be used. Although six chemicals have been shown, there may be fewer chemicals or there may be more, and although three washing machines are indicated, there may be only one or two washing machines or there may be many more. The principles will remain the same.

Thus, each of the liquid chemicals is stored in its respective compounding and mixing tank 10, 10a, 10b, 10c, 10d, or 10e and is from there delivered by a pump 14, 14a, 14b, 14c, 14d, or 14e, through a throttle valve 24, 24a, 24b, 24c, 24d, 24e, and conduits 15, 15a, 15b, 15c, 15d, and 15e, to main conduits 16, 16a, 16b, 16c, 16d, and 16e, which through conduits 18, 18a, 18b, 18c, 18d, 18e and supply the gravity flow storage tanks 20, 20a, 20b, 20c, 20d, and 20e. Overflow above the head 22 is handled by return conduits 23, 23a, 23b, 23c, 23d, and 23e. (The different chemicals are indicated by the addition of letters to the numbers used in FIG. 1.)

Each of the six chemicals is conducted by suitable branch conduits to suitable measuring pots mastered by suitable valves. The washing machine having the discharge hopper 33 thus has branch conduits 17, 17a, 17b, 17c, 17d, and 17e leading to valves 25, 25a, 25b, 25c, 25d, and 25e which are connected to measuring pots 27, 27a, 27b, 27c, 27d, and 27e, from which conduits 29, 29a, 29b, 29c, 29d, and 29e, and 32, 32a, 32b, 32c, 32d, and 32e lead to the discharge hopper 33. It should be remarked that the diagram is deficient in not showing that each of the conduits 29, etc., go up above the head 22 for its tank 20, etc. The reason for this important feature not being shown here is that to have done so would have made the diagram to difficult to read, and reference must be made to FIG. 1, for in each instance, each of the conduits 29, 29a, etc., leading from the measuring pots 27, 27a, etc., do go up above the head 22, just as in FIG. 1, so that all eighteen of the discharge conduits 29, etc., shown in this drawing actually do that before they reach their conduits 32, etc. To indicate this, a break is shown.

The washing machine having the discharge hopper 33' is supplied with chemicals by the input conduits 17', 17a', 17b', 17c', 17d', and 17e' leading to valves 25', 25a', 25b', 25c', 25d', and 25e' into measuring pots 27', 27a', 27b', 27c', 27d', and 27e'. Similarly, the third washing machine having the discharge hopper 33" is supplied by conduits 17", 17a", 17b", 17c", 17d", and 17e" by valves 25", etc., to measuring pots 27", 27a", 27b", 27c", 27d", and 27e" and there on by suitable conduits as before. By way of example, all the pots 27, 27a, 27b, and 27e and their primes are shown as being of one size while the measuring pots 27c, 27d, and their primes are shown as being of a smaller size. This example indicates that the charges may each be of the same size or different sizes or that some may be of the one size and some may be of another size. Operation for each one of these many interconnected systems is exactly the same as that described for FIG. 1.

The point has been made that this system is best used in an integrated washing program and for that reason each of the three washing machines in FIG. 7 is shown with a control panel 70, 70' or 70". The three control devices 70, 70', and 70" may be identical or they may be different from each other because this invention is adaptable to many different types of automatic washing systems. Purley as an example, one such system is shown in some detail in FIGS. 7–9.

For the purposes of illustration again, it will be assumed that the operation at each unit 70, 70' or 70" is controlled by a metal conductive drum 71 having on it a program sheet 72, such as that shown in FIG. 8. Of course, there are an infinite variety of programs that may be provided by sheets of this general type or other types. In these drawings, the dark areas on the sheet 72 indicate openings through the sheet 72, where the drum 71 is exposed to spring-urged contact members that ride over the sheet 72. When the contact members are on the unperforated portions of the sheet 72, they make no contact with the drum 71 and therefore have at that time no electrical effect (except that of an open circuit). However, when they come to any opening, such as any of the dark areas shown, they do make contact with the drum 71 and therefore make an electrical effect by closing a circuit. Other types of programming devices are of course available for use and may be used also, but this illustrates the general principle involved.

The addition of all the liquid chemicals for any one washing machine may be controlled by a single chemicals control panel 73 such as that shown in FIG. 9, or the control panel may be integrated or assimilated into a general control panel if that is desired. For purposes of illustration, the six ingredients used in FIG. 6 are shown as the liquid chemicals employed and a name for each one is placed upon the face of the panel 73. An indicating light 74, 75, 76, 77, 78, and 79 is used in conjunction with each of these ingredients and is arranged to light up at the time when that particular ingredient is being dispensed, so that an observer can tell what is going on. Also, although the operation is normally automatic, manual dispensing may be used where desired by manual energization of the air switch 40, so that the same kind of charge can be duplicated manually. This is an override, and it is sometimes convenient in order for the washing machine operator to obtain a double charge or to control the device manually for any other reason. Thus, manual switches 80, 81, 82, 83, 84, and 85 are shown, one opposite each of these six ingredients. Some of the ingredients may be considered as so standard, such as caustic and soap, so that they are used in every cycle as of course are the rinses, which are controlled by the normal washing machine program, not by the chemicals panel 73, so that they are not shown except on FIGS. 7 and 8. On the other hand, some of the other ingredients are optional, depending upon the type of article being washed, and it is possible either to add or not to add these particular ingredients; for that purpose more additional manually operated switches are shown, enabling these ingredients to be manually omitted from an already prepared program. For example, switches 86 and 87 respectively enable one to add bleach or not to add it and to add acid or not to add it. In some instances, as where colored articles are being washed, the bleach is not desired and in other instances where all white articles are being washed, the bleach is desired, and the same program sheet 72 may be used on the same drum 71 while omitting bleach (or acid) by the operator employing the manual switch 86 or 87 in accordance with his judgment and knowledge. Similarly, the last two ingredients, the fabric softener and the starch, are never used at the same time. Some linens are definitely to be starched while others are not, and those not starched may or may not be treated with a fabric softener. For that reason a switch 88 with three positions is shown, enabling one to add either softener or starch or neihter, depending upon the type of material being washed. As will be seen later, the program is fixed so that the starch or softener is added by the same program segment, with this switch 88 controlling which one, if either, is added.

Referring now to the electrical diagram of FIG. 7, it will be seen that the switches and lamps just described are also shown on this wiring diagram, and so are the solenoids 41, 41a, 41b, 41c, 41d, and 41e which control the respective valves 40, etc. In addition to the manual override switches 80, 81, 82, 83, 84, and 85, there are contact fingers 90, 91, 92, 93, and 94 for automatic operation, and they ride over the program sheet 72 on the drum 71 and make contact at the appropriate time to energize their respective circuits. Input power 95 acts through a transformer 96 to provide the necessary power, and the solenoids 41, 41a, and so on, are switched on and off by the combination of the conductive drum 71, the program sheet 72, and the fingers 90, 91, etc., or alternatively by the manual override switches 80, 81, etc. The chemical additions are made in conjunction with a normal program which also controls the timing of additional process steps such as control of the water level, control of draining of liquid from the machine, a stop signal device which stops the machine after completion of a program, a 190° steam system, a 140° water system, a cold water system and a hot water system. The order at which these appear on the drum is not significant, and so between these the system of the present invention is added. In systems having a limited number of channels, those least useful are eliminated in order to control the addition of liquid chemicals or the system may be enlarged leaving all the alternatives which the manufacturers of the basic system have thought of but adding as well the fingers for the chemicals. Since the timing is achieved purely by the program sheet 72, the vertical location of these channels at any particular vertical position makes no particular effect; it is entirely the relative position on the X-axis of the program sheet 72 that controls when an operation takes place.

Again by way of example, the program sheet 72 of FIG. 8 is shown to conduct three programs, one for "light" washing is completely separate, and is stopped by a stop signal being at the end thereof. The program for heavy and medium is the same with the operator choosing which to use by where he sets the drum to commence in a cycle; the "heavy" merely adds an additional treatment preceding the "medium" treatment. The different items, therefore, may be programmed in time as shown in the diagram in FIG. 8, where each of these has been labeled. It will be understood that each program shown is to be read from right to left, with the signal system controlling when the device is stopped.

From the foregoing, it will be appreciated that a completely automated system of chemical addition can be worked into any of the current electrical control systems for automatic washing of commercial laundries and that this can be done either by making substitutions or additions as desired. The original manufacturer may, if he chooses, place this on his original equipment but if he does not, the supplemental system is easily added by any laundry owner, the addition taking a relatively small amount of work and consiting mainly in the installation of the supply system itself with its tanks and pipes and valves and in a small electrical box 73 and adaptation of the leads from the original control box 70.

In conclusion, the importance of the kinetic-energy-of-airflow actuation of the valve 25 should be stressed. The valve 25 closes and stays closed as a result of the kinetic energy of the air exerted at the sleeve 56, even though the head pressure may be greater than the back pressure. Actually, initial closure may be (and often is) effected by the back pressure, but once the liquid has been discharged from the measuring system 30, there is no back pressure. Yet, the kinetic energy of the flowing air is still sufficient to keep the valve 25 closed against the head pressure.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. In a system for automatically adding liquid chemicals to a laundry process, the combination of:
   a compounding and storage tank for a liquid chemical,
   a gravity flow supply tank located at a desired elevation, having a bottom inlet always open and connected to said compounding and storage tank and having an overflow conduit returning liquid above a certain head level in said gravity flow supply tank to said compounding and storage tank,
   a circulating pump for continuously moving said liquid chemical from said compounding and storage tank to said gravity flow supply tank but ineflective for heights above said head level,
   a main conduit at all times connected to said bottom inlet and said pump,
   a normally open air-actuated closure valve below said bottom inlet, connected to said main conduit,
   a measuring system having an inlet below said closure valve, and extending up to said head level, the capacity of said measuring system being a volume that is to measure a charge of said liquid chemical,
   a discharge conduit connected to said measuring system at said head level and extending a substantial distance thereabove and thence down to a discharge outlet,
   means for supplying air under pressure, and
   air valve means for connecting said means for supplying air to said closure valve and measuring system to close said valve and then to eject the measured charge from said measuring system and for disconnecting said means for supplying air from said closure valve, whereby said valve is opened by said liquid chemical and said measuring system is filled by gravity.

2. The system of claim 1 wherein the circulating pump sends the liquid chemical to said gravity flow supply tank through a throttle valve which is the agency rendering it ineffective for heights above said head level and thereby prevents liquid from being stored above the head level.

3. The system of claim 1 wherein all the conduits, said measuring system, and said closure valve are made of corrosion-resistant plastic.

4. The system of claim 1 wherein said closure valve comprises a valve seat, a movable valve member normally urged by gravity down away from said seat, and means actuated by the kinetic energy of the air under pressure flowing from said air valve means and by such back pressure as is in said measuring system for closing said valve member against said valve seat and keeping it closed by said kinetic energy along after the back pressure drops away, the same air also flowing into said measuring system for ejection of said measured charge.

5. The system of claim 4 wherein said air is brought in below said closure valve by a vertical conduit having an upper end, a sleeve with a closed end inverted on said vertical conduit with lateral clearance and with said closed end resting on said upper end, said kinetic enregy forcing said sleeve up to move said valve member up, the length of said sleeve being greater than its movement up.

6. The system of claim 1 wherein said air valve means connecting an upper portion of said measuring system to said discharge conduit at a point above said head level and below its upper extremity at the time when said air under pressure is disconnected from said closure valve and closes off the connection of the measuring system to the discharge conduit when said air under pressure is connected to said closure valve.

7. The system of claim 1 for a plurality of washing machines having for each washing machine a said measuring system, a said discharge conduit, a said closure valve, and a said air valve means, the other elements being shared in common, so that there is a single said compounding and storage tank, a single said circulating pump, a single said gravity flow supply tank, and a single said main conduit.

8. In a system for adding a plurality of liquid chemicals to each of a plurality of laundry machines, the combination of:
   a compounding and storage tank for each liquid chemical,
   a gravity flow supply tank for each said liquid chemical located at a desired elevation, having a bottom inlet always open and connected to an associated said compounding and storage tank and having an overflow conduit returning liquid above a certain head level in said gravity flow supply tank to its said compounding and storage tank, a circulating pump for continuously moving each said liquid chemical from its said compounding and storage tank to its said gravity flow supply tank and ineffective above said head level, an open main conduit leading from each said bottom inlet, for each said liquid chemical, a plurality of branch conduits leading from each said main conduit, a normally open air-actuated closure valve in each said branch conduit below said head level, a measuring system for each said closure valve having an inlet connected to the opposite side of its said closure valve from said main conduit and extending up to said head level, the capacity of said measuring system being the measure of a desired charge of that particular chemical, a discharge conduit connected to each said measuring system at said head level and extending a substantial distance thereabove to a high point and thence down again to a discharge outlet.

a discharge hopper for each said laundry machine into which one discharge conduit for each said chemical empties, means for supplying air under pressure, and air valve means for each said closure valve for connecting and dismounting said means for supplying air under pressure to said closure valve for opening and closing said closure valve and, when said closure valve is closed to eject the liquid from said measuring system into a said discharge hopper.

References Cited

UNITED STATES PATENTS

| | | | |
|---|---|---|---|
| 759,827 | 5/1904 | McCallum | 222—373 |
| 1,560,667 | 11/1925 | Crowder | 222—373 X |
| 2,155,943 | 4/1939 | Kittredge et al. | 222—373 |
| 2,520,398 | 8/1950 | Hanks | 222—373 |
| 3,308,786 | 3/1967 | Wise et al. | 222—373 X |

SAMUEL F. COLEMAN, Primary Examiner

U.S. Cl. X.R.

222—373

PO-1050
(5/69)

UNITED STATES PATENT OFFICE
CERTIFICATE OF CORRECTION

Patent No. 3,495,743          Dated February 17, 1970

Inventor(s) Robert A. Mohr and Walter S. Medley

It is certified that error appears in the above-identified patent and that said Letters Patent are hereby corrected as shown below:

Column 1, line 37, before "sleeve" insert -- a --; line 64, ":" should read -- . --; line 72, "questions" should read -- question --. Column 2, line 18, "htis" should read -- this --. Column 3, line 38, "lever" should read -- level --; line 75, "flow" should read -- flows --. Column 4, line 44, "thereby" should read -- there by --; line 74, "33¹ "" should read -- 33" --. Column 5, line 12, "16b" should read -- 18b --; line 31, "to difficult" should read -- too difficult --. Column 6, line 56, "neihter" should read -- neither --. Column 8, line 2, "ineflective" should read -- ineffective --; line 40, "along" should read -- alone --; line 47, "enregy" should read -- energy --. Column 9, line 22, "." should read -- , --.

SIGNED AND
SEALED
AUG 25 1970

(SEAL)
Attest:

Edward M. Fletcher, Jr.
Attesting Officer

WILLIAM E. SCHUYLER, JR.
Commissioner of Patents